US012686641B2

(12) United States Patent
Lin et al.

(10) Patent No.: US 12,686,641 B2
(45) Date of Patent: Jul. 21, 2026

(54) METHOD AND COMPOSITION TO PRODUCE HIGH TRANSLUCENCY DENTAL CERAMICS

(71) Applicant: James R. Glidewell Dental Ceramics, Inc., Newport Beach, CA (US)

(72) Inventors: May Yun Hsuan Lin, Arcadia, CA (US); Yan Yang, Irvine, CA (US); Sreeram Balasubramanian, Irvine, CA (US); Hugo Gonzalez, Whittier, CA (US); Dimple Pradhan, Irvine, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 702 days.

(21) Appl. No.: 18/145,314

(22) Filed: Dec. 22, 2022

(65) Prior Publication Data

US 2023/0202931 A1     Jun. 29, 2023

Related U.S. Application Data

(60) Provisional application No. 63/302,257, filed on Jan. 24, 2022, provisional application No. 63/293,994, filed on Dec. 27, 2021.

(51) Int. Cl.
*C04B 35/48*          (2006.01)
*A61C 13/00*          (2006.01)
(Continued)

(52) U.S. Cl.
CPC .......... *C04B 35/48* (2013.01); *A61C 13/0022* (2013.01); *C04B 35/62645* (2013.01); *C04B 35/64* (2013.01); *C04B 41/0072* (2013.01);

*C04B 41/4535* (2013.01); *C04B 41/5029* (2013.01); *C04B 41/87* (2013.01); *C04B 2235/3206* (2013.01); *C04B 2235/3225* (2013.01); *C04B 2235/3246* (2013.01);
(Continued)

(58) Field of Classification Search
CPC . C04B 35/48; C04B 41/87; C04B 2235/3225; C04B 2235/3246; C04B 2235/762
See application file for complete search history.

(56) References Cited

U.S. PATENT DOCUMENTS 9,095,403 B2     8/2015  Carden et al.
9,365,459 B2     6/2016  Carden et al.
(Continued)

FOREIGN PATENT DOCUMENTS

WO      20140993329 A1     6/2014
WO       2018155459 A1     8/2018

OTHER PUBLICATIONS https://ceramics.net/wp-content/uploads/stc-white-paper-msz-magnesia-stabilized-zirconia-01062021-2.pdf Published Jan. 6, 2021 Accessed Oct. 8, 2025 (Year: 2021).*
(Continued)

*Primary Examiner* — Cameron K Miller
(74) *Attorney, Agent, or Firm* — Klarquist Sparkman, LLP

(57) ABSTRACT

Translucency of a yttria-stabilized zirconia ceramic is improved to achieve even higher translucency than what is currently offered on the market, without greatly altering its mechanical properties. The enhancement is done by incorporating magnesium-containing dopants into the microstructure of yttria-stabilized zirconia ceramic dental ceramics.

11 Claims, 1 Drawing Sheet

(51) Int. Cl.

| | |
|---|---|
| *C04B 35/626* | (2006.01) |
| *C04B 35/64* | (2006.01) |
| *C04B 41/00* | (2006.01) |
| *C04B 41/45* | (2006.01) |
| *C04B 41/50* | (2006.01) |
| *C04B 41/87* | (2006.01) |

(52) U.S. Cl.
CPC .. *C04B 2235/604* (2013.01); *C04B 2235/661* (2013.01); *C04B 2235/762* (2013.01); *C04B 2235/786* (2013.01); *C04B 2235/9653* (2013.01)

(56) References Cited

U.S. PATENT DOCUMENTS

| | | | |
|---|---|---|---|
| 9,434,651 | B2 | 9/2016 | Carden |
| 9,505,662 | B2 | 11/2016 | Carden et al. |
| 9,724,274 | B2 | 8/2017 | Berner |
| 9,872,746 | B2 | 1/2018 | Hauptmann et al. |
| 9,949,808 | B2 | 4/2018 | Wolz |
| 2009/0115084 | A1 | 5/2009 | Moon |
| 2013/0313738 | A1 | 11/2013 | Carden |
| 2015/0297466 | A1* | 10/2015 | Jahns ................... A61K 8/0241 106/35 |
| 2016/0310245 | A1 | 10/2016 | Fujisaki et al. |
| 2017/0189143 | A1 | 7/2017 | Wolz |
| 2018/0029943 | A1 | 2/2018 | Zwahlen et al. |
| 2018/0235847 | A1 | 8/2018 | Balasubramanian et al. |
| 2018/0237345 | A1 | 8/2018 | Valenti et al. |
| 2019/0284103 | A1 | 9/2019 | Cornell et al. |
| 2020/0062653 | A1* | 2/2020 | Yang ..................... C04B 35/486 |
| 2020/0113658 | A1 | 4/2020 | Ban et al. |

OTHER PUBLICATIONS

Damian Nakonieczny et al., Characterization of magnesia-doped-yttria-stabilized zirconia powders for dental technology applications, ResearchGate, Article in Acta of bioengineering and biomechanics/Wroclaw University of Technology, vol. 16, No. 4, Jan. 2014, in 9 pages.

Bilal Soylemez, et al. Fracture toughness enhancemetn of yttria-stabilized tetragonal zirconia polycrystalline ceramics through magnesia-partially stabilized zirconia addition, Journal of Science, Advanced Materials and Devices, in 8 pages.

Ali Omar Turky et al., Achieving exceedingly constructional characterization of magnesia-yttria (MgO—Y2O3) nanocomposite obtained via oxalate precursor startegy, ResearchGate, Aug. 2019, Elsevier, Measurement 150 (2020) 106888.

C. Yamagata et al., Synthesis and Mechanical Properties of Stabilized Zirconia Ceramics: MgO—ZrO2 and Y2O3—MgO—ZrO2, 2014, in 184 pages.

Xianqiang Chen et al., Fabrication and optical properties of highly transparent MgO ceramics by spark plasma sintering, Kazuo Inamori School of Engineering, New York State College of Ceramics, Alfred University, Alfred, NY 14802, USA, Elsevier, Scripta Materialia, 162 (2019) 14-17, in 4 pages.

Eddy Brinkman, Light Transmission of aluminium oxide, downloaded Dec. 4, 2023, in 2 pages.

Superior Technical Ceramics, Magnesia Stabilized Zirconia (MSZ): Why does MSZ have a better high temperature strength than YTZP?, www.ceramics.net, 2021.

* cited by examiner

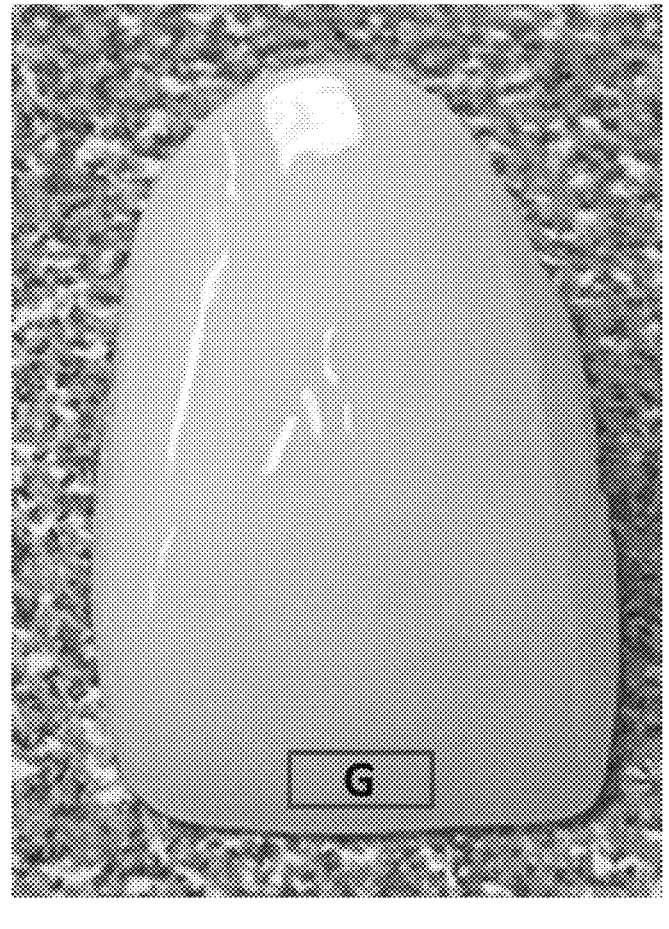

METHOD AND COMPOSITION TO PRODUCE HIGH TRANSLUCENCY DENTAL CERAMICS

This application claims the benefit of and priority to U.S. Provisional Application No. 63/293,994, filed Dec. 27, 2021, and U.S. Provisional Application No. 63/302,257, filed Jan. 24, 2022, both of which are incorporated herein by reference.

BACKGROUND

Dental prosthetic devices, such as crowns, bridges, inlays, onlays, and veneers, are preferably formed from materials having good mechanical properties, including high flexural strength and high fracture toughness. In addition, these materials should preferably have a natural appearance in color, texture, translucency and shape so that they are not readily distinguishable from the original natural teeth.

There has been an increase in all-ceramic dental restoration in recent years as material technology advances. Zirconia has been heavily studied in the field of dental materials and is well-known for its good mechanical properties (high strength and high fracture toughness) and good biocompatibility. However, the material by itself lacks the esthetic of natural teeth. Large efforts have been put into enhancing the esthetic (translucency) of zirconia by adding yttria.

Ceramic materials, and particularly yttria-stabilized zirconia (YSZ), have been widely adopted for use in dental restorations because these materials have high strength and high fracture toughness. For example, U.S. Pat. No. 9,309, 157 (assigned to Tosoh Corporation) describes zirconia sintered bodies for use in dental applications that are formed with yttria-stabilized zirconia powder, having 2 mol % to 4 mol % yttria as a stabilizer, and having reported three-point bending strength of 1,000 MPa or higher.

Conventional methods of manufacturing dental ceramic materials include molding a mixture of starting materials that includes yttria-stabilized zirconia powder into a green body, typically by press molding methods such as uniaxial pressing or cold isostatic pressing (CIP). In addition to the yttria-stabilized zirconia ceramic, starting materials for the conventional press molding methods may include a small amount (e.g., from 0 wt % to 0.25 wt % of the zirconia powder) of aluminum oxide ($Al_2O_3$) as an additive, and an organic binder (e.g., from 0.5 wt % to 10 wt %) to facilitate the press molding process. The green body can then be sintered at a sintering temperature of from 1450° C. to 1600° C. to obtain a zirconia sintered body.

US 2016/0310245 (also assigned to Tosoh Corporation) describes zirconia sintered bodies for use in dental applications that are formed from zirconia powder containing 4 mol % yttria to 6.5 mol % yttria, as a stabilizer. The '245 publication describes sintered bodies having total light transmittance of 37% to 40% to light at a wavelength of 600 nm. The International Organization for Standardization (ISO) specification of requirements for ceramic materials used in dentistry—ISO 6872:2015—requires that materials used for monolithic ceramic prostheses of up to 3 units should have a flexural strength of at least 500 MPa.

SUMMARY

Disclosed herein is a material comprising:
a sintered yttria-stabilized zirconia ceramic, stabilized by 3 mol % to 4.8 mol % yttria, wherein the sintered ceramic has a flexural strength greater than 500 MPa, a transmittance of 59% to 62% at 700 nm (when measured on a 1 mm thick fully sintered ceramic body), an average grain size of less than 4 μm, and a cubic phase of 20% to 40%.

Also disclosed herein is a material comprising:
a sintered yttria-stabilized zirconia ceramic, stabilized by 4 mol % to 5.4 mol % yttria, wherein the sintered ceramic has a transmittance of 60% to 68% at 700 nm (when measured on a 1 mm thick fully sintered ceramic body), an average grain size of less than 4 μm, and a cubic phase of 25% to 45%, and wherein the sintered ceramic comprises 0.1 wt % to 2 wt % MgO.

Further disclosed herein is a material comprising:
a sintered yttria-stabilized zirconia ceramic, stabilized by 4.5 mol % to 6 mol % yttria, wherein the sintered ceramic has a transmittance of 65% to 70% at 700 nm (when measured on a 1 mm thick fully sintered ceramic body), an average grain size of less than 6 μm, and a cubic phase of 42% to 55%, and wherein the sintered ceramic comprises 0.1 wt % to 2 wt % MgO.

Additionally disclosed herein is a material comprising:
a sintered yttria-stabilized zirconia ceramic, stabilized by 5 mol % to 6.5 mol % yttria, wherein the sintered ceramic has a transmittance of 70% to 80% at 700 nm (when measured on a 1 mm thick fully sintered ceramic body), an average grain size of less than 10 μm, and a cubic phase of 42% to 70%, and wherein the sintered ceramic comprises 0.1 wt % to 2 wt % MgO.

Also disclosed herein is a method for making a sintered ceramic body comprising:
painting a surface of a porous yttria-stabilized zirconia mill blank with a magnesium-containing solution; and sintering the painted mill blank resulting in a sintered ceramic body.

Further disclosed herein is a method for making a sintered ceramic body comprising:
spraying or ink jet printing a magnesium-containing solution onto a surface of a porous yttria-stabilized zirconia mill blank; and sintering the sprayed or printed mill blank resulting in a sintered ceramic body.

Additionally disclosed herein is a method for making a sintered ceramic body comprising:
mixing a magnesium-containing solution with a yttria-stabilized zirconia powder;
pressing or casting the resulting mixture into a green block;
bisque the green block resulting in a bisqued body; and sintering the bisqued body resulting in a sintered ceramic body.

The foregoing will become more apparent from the following detailed description, which proceeds with reference to the accompanying figures.

BRIEF DESCRIPTION OF THE DRAWINGS

FIG. 1. Area of the incisal region used to acquire L* data.

DETAILED DESCRIPTION

Disclosed herein are methods for making sintered ceramic bodies having high strength and translucency properties suitable for use as dental restorations.

In certain embodiments, translucency of a yttria-stabilized zirconia ceramic is improved to achieve even higher translucency than what is currently offered on the market. The enhancement is done by incorporating magnesium-containing dopants into the microstructure of yttria-stabilized zirconia ceramic dental ceramics.

Magnesium-containing dopants are used as a sintering aid to refine the grain growth and densification of zirconia during the sintering process. The well-densified doped zirconia will have less porosity and in turn increase the translucency of the material while maintaining good strength.

The magnesium-containing dopant may be in the form of a hydroxide, alkoxide, oxide, or a salt of magnesium. Illustrative magnesium salts include nitrate, sulfate, carbonate, chloride and hydrates thereof. In some embodiments, the magnesium-containing dopant is $Mg(NO_3)_2(H_2O)_x$, wherein x is 0, 2 or 6. In some embodiments, the magnesium-containing dopant may be dissolved in an organic solvent or a non-organic solvent.

In some embodiments, the magnesium-containing dopant converts into MgO upon sintering.

In some embodiments, the sintered yttria-stabilized zirconia ceramic comprises up to 4 wt % MgO. In some embodiments, the sintered yttria-stabilized zirconia ceramic comprises at least 0.1 wt % MgO. In some embodiments, the sintered yttria-stabilized zirconia ceramic comprises 0.1 wt % to 2 wt % MgO, or 0.1 wt % to 1 wt % MgO, or 0.2 wt % to 0.7 wt % MgO, or 0.2 wt % to 0.6 wt % MgO.

Method steps include processes for forming ceramic green bodies, bisque heating the green body to form a ceramic bisqued body, and sintering the bisqued body to obtain a ceramic sintered body. Methods also include one or more shaping processes, such as machining, milling or grinding, for shaping the ceramic material into a shaped body. The resulting ceramic sintered bodies have a combination of high strength and translucency desirable for forming dental restorations having high strength and esthetic properties comparable to those of natural teeth.

Green body manufacturing methods may include dry forming processes, such as uniaxial pressing and cold isostatic pressing, and wet forming processes, including but not limited to, slip-casting processes, pressure-casting, vacuum casting, filter pressing, and centrifugal casting methods. A green body manufacturing method such as a slip-casting process includes the steps of selecting starting materials; mixing and comminuting the starting materials to form a slurry; and casting the slurry to form a desired green body form, such as the shape of a milling block. Casting methods suitable for use herein include methods described in US Patent Publication 2009/0115084 published May 7, 2009, U.S. Pat. No. 9,434,651, issued Sep. 6, 2016, U.S. Pat. No. 9,365,459, issued Jun. 14, 2016, and US Patent Publication 2018/0235847, published Aug. 23, 2018, which are incorporated by reference herein, in their entireties.

Sintered zirconia ceramic materials may be stabilized by 3 mol % to 8 mol % yttria. Starting materials for wet forming processes may include, but are not limited to, ceramic powder, dispersant, and deionized water to form ceramic slurries. Yttria-stabilized zirconia ceramic material in the slurry may comprise up to 7.5 mol % yttria, or up to 8.5 mol % yttria, for example, from 5 mol % yttria to 8.5 mol % yttria, from 5 mol % yttria to 8 mol % yttria, from 5 mol % yttria to 7.5 mol % yttria, 5 mol % yttria to 6.4 mol % yttria, from 5 mol % yttria to 5.6 mol % yttria, from 5.1 mol % yttria to 6.4 mol % yttria, from 5.2 mol % yttria to 7.5 mol % yttria, from 5.2 mol % yttria to 7.0 mol % yttria, from 5.4 mol % yttria to 7.5 mol % yttria, from 5.4 mol % yttria to 7.0 mol % yttria, from 5.5 mol % yttria to 7.5 mol % yttria, from 5.5 mol % yttria to 7 mol % yttria, from 5.5 mol % yttria to 6.9 mol % yttria, from 5.5 mol % yttria to 6 mol % yttria, from 5.5 mol % yttria to 5.9 mol % yttria, from 5.6 mol % yttria to 6.3 mol % yttria, from 5.7 mol % yttria to 6.3 mol % yttria, from 5.8 mol % yttria to 6.3 mol % yttria, from 6 mol % yttria to 8.5 mol % yttria, from 6 mol % yttria to 8 mol % yttria, from 6.0 mol % yttria to 7.5 mol % yttria, from 6 mol % yttria to 7 mol % yttria, from 6.0 mol % yttria to 6.8 mol % yttria, from 6.0 mol % yttria to 6.3 mol % yttria, from 6.2 mol % yttria to 7.5 mol % yttria, from 6.4 mol % yttria to 7.5 mol % yttria, from 7 mol % yttria to 8.5 mol % yttria, or from 7.2 mol % to 8.4 mol % yttria, to stabilize zirconia.

Yttria-stabilized zirconia ceramic material may be made from a mixture of one or more unstabilized zirconia and/or stabilized zirconia ceramic materials. The term stabilized zirconia ceramic herein includes fully stabilized and partially stabilized zirconia. For example, an yttria-stabilized zirconia ceramic material may be made from both unstabilized zirconia having no yttria or other stabilizer, and one or more yttria-stabilized zirconia ceramic materials, including, but not limited to, commercially available yttria-stabilized zirconia, for example, from Tosoh USA, such as Tosoh TZ-3YS, Tosoh PX430, and Tosoh TZ8YS. The calculated amount of yttria (e.g., yttria mol %) in yttria-stabilized zirconia ceramic material may vary from 'nominal' values implied by commercial nomenclature (e.g. 3YS). The mol % yttria in zirconia ceramic material may be calculated, for example, based on compositional information received from manufacturer certification.

Zirconia ceramic materials used to prepare yttria-stabilized zirconia ceramic material mixtures include materials stabilized with 0 mol % yttria, 0.1 mol % to 2 mol % yttria, 2 mol % to 4 mol % yttria, 4 mol % to 6 mol % yttria, 5 mol % to 7 mol % yttria, 5 mol % to 8 mol % yttria, and 8 mol % to 10 mol % yttria. Yttria-stabilized zirconia ceramic materials suitable for use herein include mixtures of two or more zirconia ceramic materials stabilized with different amounts of yttria combined to obtain a total amount of yttria (mol %) in the zirconia ceramic material.

Yttria-stabilized zirconia ceramic materials used as starting materials may optionally include a small amount of alumina (aluminum oxide, $Al_2O_3$) as an additive. For example, some commercially available yttria-stabilized zirconia ceramic material include alumina at concentrations of from 0 wt % to 2 wt %, or from 0 wt % to 0.25 wt %, such as 0.1 wt %, relative to the zirconia material. Still other optional additives include grain growth inhibitors, sintering aids, and/or toughening aids.

Coloring agents also may be added directly to the ceramic powder to create shaded sintered zirconia ceramic materials having dentally acceptable shades after sintering to theoretical density. As used herein, unshaded zirconia ceramic materials refer to materials in which no coloring agent has been added, and unshaded zirconia ceramic materials often have a bright white appearance conventionally considered esthetically unsuitable for use as a dental restoration without the addition of further coloring or staining. Shaded zirconia ceramic materials comprise additives that may include, but are not limited to metal-containing oxides, salts, or other compounds or complexes that include erbium (Er), terbium (Tb), chromium (Cr), cobalt (Co), iron (Fe), manganese (Mn), nickel (Ni), praseodymium (Pr), copper (Cu), and/or other coloring metal ions in an amount to obtain desired dental shades in final sintered restorations. In some embodiments, shaded yttria-stabilized zirconia ceramic material that has been sintered to approximately full theoretical density match a shade tab from a Vita A1-D4® Classical Shades shade guide or Vita Bleached Shades shade guide, such as 0M1, 0M2 or 0M3 bleach shades, (available through Vita North America) when measured according to the shade match evaluation test method provided herein. In some embodiments, coloring compositions may be applied to the ceramic body after formation of the green, bisque or sintered ceramic body, and may comprise a coloring agent having at least one metal included, but not limited to, Tb, Er, Cr, Fe, Mn, Ni, Pr, Cu or Co, and combinations thereof. In some embodiments, the amount of coloring agent in a sintered ceramic body may be from 100 ppm to about 2000 ppm, or 200 ppm to 1500 ppm, (measured as metal ion) per gram of the yttria-stabilized zirconia ceramic material. Other esthetic additives may be included to obtain desired opalescence or fluorescence properties for dental applications.

Dispersants used to form ceramic suspensions or ceramic slurries to form green bodies by slip-casting manufacturing methods such as those described herein, function by promoting the dispersion and/or stability of the slurry and/or decreasing the viscosity of the slurry. Dispersion and deagglomeration may occur through electrostatic, electrosteric, or steric stabilization. Examples of suitable dispersants include nitric acid, hydrochloric acid, citric acid, diammonium citrate, triammonium citrate, polycitrate, polyethyleneimine, polyacrylic acid, polymethacrylic acid, polymethacrylate, polyethylene glycols, polyvinyl alcohol, polyvinyl pyrillidone, carbonic acid, and various polymers and salts thereof. These materials may be either purchased commercially, or prepared by known techniques. Specific examples of commercially available dispersants include Darvan® 821-A ammonium polyacrylate dispersing agent commercially available from Vanderbilt Minerals, LLC; Dolapix™ CE 64 organic dispersing agent and Dolapix™ PC 75 synthetic polyelectrolyte dispersing agent commercially available from Zschimmer & Schwarz GmbH; and Duramax™ D 3005 ceramic dispersant commercially available from Dow Chemical Company.

Zirconia ceramic and dispersant starting materials added to deionized water may be mixed to obtain a slurry. Slurries may be subjected to a comminution process for mixing, deagglomerating and/or reducing particle size of zirconia ceramic powder particles. Comminution may be performed using one or more milling process, such as attritor milling, horizontal bead milling, ultrasonic milling, or other milling or comminution process, such as high shear mixing or ultra-high shear mixing capable of reducing zirconia ceramic powder particle sizes described herein.

In one embodiment, a zirconia ceramic slurry may undergo comminution by a horizontal bead milling process. Media may comprise zirconia-based beads, for example, having a diameter of 0.4 mm. A suspension or slurry having a zirconia ceramic solids loading of about 60 wt % to about 80 wt % and a dispersant concentration from 0.004 gram dispersant/gram zirconia ceramic powder to 0.01 gram dispersant/gram zirconia ceramic powder, may be used to prepare the zirconia ceramic slurry. Milling processes may include, for example, a flow rate of 1 kg to 10 kg zirconia ceramic powder/hour, such as, approximately 6 kg zirconia ceramic powder/hour where, for example, approximately 6 kg of zirconia ceramic material is milled for approximately one hour, at a mill speed of approximately 1500 rpm to 3500 rpm, for example, approximately 2000 rpm.

In some embodiments, where commercially available zirconia ceramic is used as starting materials to prepare the ceramic slurry, the measured median particle size, or particle size distribution at $D_{(50)}$ may be about 200 nm to 600 nm, or greater than 600 nm, which includes agglomerations of particles of crystallites having a crystallite size of about 20 nm to 40 nm. As used herein, the term "measured particle size" refers to measurements obtained by a Brookhaven Instruments Corp. X-ray disk centrifuge analyzer. By processes described herein, an initial particle size distribution at, for example, a $D_{(50)}$ of about 200 nm to 600 nm, or greater than 600 nm, may be reduced to provide a zirconia ceramic material contained in a slurry having a median particle size where $D_{(50)}$ is from 100 nm to 600 nm, such as, wherein $D_{(50)}$ is from 150 nm to 350 nm, or from 220 nm to 320 nm or wherein $D_{(50)}$ is from 250 nm to 300 nm. In some embodiments, after comminution processes ceramic slurries comprise particle size distributions wherein $D_{(10)}$ is from 100 nm to 250 nm, or $D_{(10)}$ is from 120 nm to 220 nm, or $D_{(10)}$ is from 120 nm to 200 nm, and $D_{(90)}$ of zirconia particles is less than 800 nm, or $D_{(90)}$ is in the range of 250 nm to 425 nm.

By processes described herein, zirconia ceramic material may comprise an initial median particle size, for example, a $D_{(50)}$ of less than 400 nm, which upon comminution may provide a slurry comprising a zirconia ceramic material having a median particle size where $D_{(50)}$ is from 100 nm to 350 nm, such as, wherein $D_{(50)}$ is from 80 nm to 280 nm. Y Yttria-stabilized zirconia ceramic material comprising mixtures of two or more yttria stabilized zirconia ceramic materials each having different initial median particle sizes, may be comminuted as a mixture in a slurry by the processes described herein. Reduced particle sizes and/or narrow ranges of comminuted zirconia ceramic material, in combination with the dispersants describe above, may provide cast parts with a higher density and smaller pores that form sintered bodies having higher translucency and/or strength than those obtained by way of conventional pressing and slip-casting processes.

Zirconia ceramic slurries may be cast into a desired shape, such as a solid block, disk, near net shape, or other shape. Ceramic slurries may be poured into a porous mold (e.g., plaster of paris or other porous/filtration media) having the desired shape, and cast, for example, under the force of capillary action, vacuum, pressure, or a combination thereof (for example, by methods provided in US 2013/0313738, which is hereby incorporated by reference in its entirety). Green bodies may form a desired shape as water contained in the slurry is absorbed/filtered through the porous media. Excess slurry material, if any remaining, may be poured off the green body. Green bodies removed from molds may dry, for example, at room temperature in a controlled, low humidity environment. Dental milling blanks may be cast, for example, as a solid block, disk or near-net-shape, having dimensions suitable for use in milling or grinding single unit or multi-unit restorations, such as crowns, veneers, bridges, partial or full-arch dentures, and the like.

Manufacturing processes described herein may provide green bodies having relative densities $\rho_R$ greater than 48%, such as from 52% to 65% relative density, or such as from 56% to 62% relative density. As used herein, the term "relative density" ($\rho_R$) refers to the ratio of the measured density $\rho_M$ of a sample (g/cm$^3$) to the theoretical density $\rho_T$ for the zirconia ceramic material, provided in Table 1, (i.e., $\rho_R = \rho_M/\rho_T$).

Green bodies may be partially consolidated to obtain bisqued bodies by a heating step. Bisquing methods include heating or firing green bodies, such as green bodies in the shape of blocks to obtain, for example, porous bisqued blocks. In some embodiments, relative densities of bisque blocks do not increase more than 5% over the green body density. In some embodiments, the ceramic bodies are bisque heated so that the difference between the relative densities of the bisque body and the green body is 3% or less. Resulting bisqued bodies may be fully dried and have strength sufficient to withstand packaging, shipping, and milling, and in some embodiments, have a hardness value of less than or equal to 0.9 GPa, when tested by the hardness test method described herein. Bisque firing steps may include heating the green body at an oven temperature of from 800° C. to 1100° C. for a holding period of about 0.25 hours to 3 hours, or about 0.25 hours to 24 hours, or by other known bisquing techniques. In some embodiments, bisque processes comprise heating green bodies in an oven heated at an oven temperature of 900° C. to 1000° C. for 30 minutes to 5 hours.

Processes described herein may provide a bisqued body having a relative density $\rho_R$ greater than or equal to 48%, such as from 48% to 62%, or from 54% to 60% Bisqued bodies may have a porosity of less than or equal to 45%, such as from 35% to 45%, or from 38% to 42%, or from 38% to 41%. As used herein, the term "porosity", expressed as percent porosity above, is calculated as: percent porosity=1– percent relative density. A dental block for producing a dental prosthesis includes a zirconia bisqued body having a density of between 56% to 65% of theoretical density and having a porosity of between 35% and 44%, such as between 38% and 41%.

In some embodiments, the median pore size of bisque bodies is less than 200 nm, or less than 150 nm, less than 100 nm, such as from 30 nm to 150 nm, or from 30 nm to 80 nm, or from 35 nm to 40 nm, or from 40 nm to 80 nm, or from 40 nm to 70 nm, or from 45 nm to 75 nm, or from 45 nm to 50 nm, or from 50 nm to 80 nm, or from 50 nm to 75 nm, or from 55 nm to 80 nm, or from 55 nm to 75 nm, when measured according to the methods described herein. As used herein, the term "median pore diameter" refers to the pore diameter measurements obtained from a bisqued body via mercury intrusion performed with an Autopore V porosimeter from Micromeritics Instrument Corp.

Conventional subtractive processes, such as milling or machining processes known to those skilled in the art, may be used to shape a bisqued zirconia ceramic body or milling block into a pre-sintered dental restoration. For dental applications, a pre-sintered restoration may include a dental restoration such as a crown, a multi-unit bridge, an inlay or onlay, a veneer, a full or partial denture, or other dental restoration. For example, bisque stage blocks milled to form bisque-stage dental restorations having anatomical facial surface features including an incisal edge or biting surface, anatomical dental grooves and cusps, and are sintered to densify the bisque-stage restoration into the final dental restoration that may permanently installed in the mouth of a patient. In alternative embodiments, bisque-stage zirconia ceramic bodies are shaped into near-net-shape blocks having generic sizes and shapes that are sintered to theoretical density prior to machining into a final patient-specific dental restoration. The sintered near-net-shape bodies may be prepared having a shape and/or size that is suitable for range of similarly sized and shaped final restoration products.

Bisqued bodies or pre-sintered parts may be "fully sintered" under atmospheric pressure to achieve a density that is at least 98% of the theoretical density of a sintered body. Ceramic bodies that are tested, for example, for flexural strength and translucency (measured as percent transmittance) are 'fully sintered' to 98% to 100%, of theoretical density.

Bisqued, or pre-sintered, bodies, may be "fully sintered" under atmospheric pressure by sintering to a density that is at least 98% of the theoretical density of the ceramic material. Sintering temperature ranges may include oven temperatures greater than or equal to 1200° C., such as from 1200° C. to 1700° C., or from 1200° C. to 1680° C., or from 1200° C. to 1650° C., from 1200° C. to 1600° C., or from 1400° C. to 1580° C., or from 1400° C. to 1450° C., or from 1600° C. to 1700° C., or from 1620° C. to 1680° C., or from 1630° C. to 1670° C. Sintering profiles may include one or more optional hold times (dwell times) at a temperature within a sintering temperature range, such as a hold time from 1 minute to 48 hours, such as from 10 minutes to 5 hours, or from 10 minutes to 3 hours, or from 30 minutes to 4 hours, or from 1 hour to 4 hours, or from 1 hour to 3 hours, or from 2 hours to 2.5 hours.

White, unshaded zirconia sintered bodies obtained by the processes described herein demonstrate combinations of high translucency at identified wavelengths (e.g., 700 nm, for 1 mm thick sintered body), and high flexural strength values that have not been achieved by zirconia sintered bodies having similar yttria concentrations that have been manufactured by conventional manufacturing methods.

In some embodiments, a ceramic body comprises sintered yttria-stabilized zirconia ceramic material that has a total light transmittance value of 59% to 62% at 700 nm (measured on a 1 mm thick fully sintered ceramic body), such as 59% to 60%, or 59% to 62%, and a flexural strength greater than 500 MPa, or greater than 800 MPa, was made from yttria-stabilized zirconia ceramic material comprising 3 mol % yttria to 4.8 mol % yttria, or 4.2 mol % yttria to 4.7 mol % yttria, or 4 mol % yttria. In some embodiments, the sintered yttria-stabilized zirconia ceramic material an average grain size of less than 4 μm, or less than 3 μm, and a cubic phase of 20% to 40%, or 25% to 38%, or 25% to 32%, or 30% to 37%. In some embodiments, the sintered ceramic has a fracture toughness greater than 2.2 $MPa*m^{1/2}$.

In some embodiments, the sintered yttria-stabilized zirconia ceramic material has a total light transmittance value of 60% to 68%, or 60% to 65%, at 700 nm (measured on a 1 mm thick fully sintered ceramic body), stabilized with 4 mol % yttria to 5.4 mol % yttria, or 5.3 mol % yttria, and having an average grain size of less than 4 μm, or less than 3.5 μm, a cubic phase of 25% to 45%, or 30% to 42%, or 30% to 38%, and wherein the sintered ceramic comprises 0.1 wt % to 2 wt % MgO, or 0.2 wt % to 0.7 wt % MgO, or 0.2 wt % to 0.6 wt % MgO. In some embodiments, the sintered yttria-stabilized zirconia ceramic material has a flexural strength greater than or equal to 500 MPa, or greater than or equal to 600 MPa, or greater than or equal to 700 MPa, or greater than or equal to 800 MPa, when tested according to the methods described herein. In some embodiments, the sintered ceramic has a fracture toughness greater than 1.7 $MPa*m^{1/2}$.

In some embodiments, the sintered yttria-stabilized zirconia ceramic material has a total light transmittance value of between 65% and 70%, at 700 nm (measured on a 1 mm thick fully sintered ceramic body), stabilized with 4.5 mol % yttria to 6 mol % yttria, or 4.5 mol % yttria to 5.5. mol % yttria, and having an average grain size of less than 6 μm, or less than 4 μm, a cubic phase of 42% to 55%, or 40% to 50%, or 44% to 48%, or less than 50%, and wherein the sintered ceramic comprises 0.1 wt % to 2 wt % MgO, or 0.2 wt % to 0.7 wt % MgO, or 0.2 wt % to 0.6 wt % MgO. In some embodiments, the sintered yttria-stabilized zirconia ceramic material has a flexural strength greater than or equal to 500 MPa, or greater than or equal to 600 MPa, or greater than or equal to 700 MPa, or greater than or equal to 800 MPa, when tested according to the methods described herein. In some embodiments, the sintered ceramic has a fracture toughness greater than 1.5 MPa*m$^{1/2}$.

In some embodiments, the sintered yttria-stabilized zirconia ceramic material has a total light transmittance value of at least 70%, or greater than 75%, or 70% to 80%, at 700 nm (measured on a 1 mm thick fully sintered ceramic body), stabilized with 5 mol % yttria to 6.5 mol % yttria, or 6 mol % yttria, an average grain size of less than 10 μm, or less than 5 μm, a cubic phase of 42% to 70%, or 50% to 60%, or 48% to 56%, or less than 50%, and wherein the sintered ceramic comprises 0.1 wt % to 2 wt % MgO, or 0.2 wt % to 0.7 wt % MgO, or 0.2 wt % to 0.6 wt % MgO. In some embodiments, the sintered yttria-stabilized zirconia ceramic material has a flexural strength greater than or equal to 500 MPa, or greater than or equal to 600 MPa, or greater than or equal to 700 MPa, or greater than or equal to 800 MPa, when tested according to the methods described herein. In some embodiments, the sintered ceramic has a fracture toughness greater than 1.5 MPa*m$^{1/2}$.

In a further embodiment, shaded sintered yttria-stabilized zirconia ceramic bodies may be prepare, which upon milling and/or sintering, form a final dental restoration having a dentally acceptable shade, or having shade equivalence to, for example, a Vita A1-D4® Classical Shade or a Vita bleached shade (when tested according to the Shade Matching test provided herein). Shaded ceramic bodies may be prepared by mixing coloring agents (provided above) with a ceramic material prior to formation as a green body. For example, yttria-stabilized zirconia ceramic powder may be shaded by the addition of coloring agents directly to ceramic powder, or by the addition of coloring agents to zirconia ceramic slurry prior to, or during, a wet processing method. Alternatively, coloring agents may be incorporated into a porous bisque ceramic structure prior to sintering, for example, by processes such as infiltration, painting, dripping, dipping, and the like. Further, sintered bodies may be colorized by methods such as, painting, dipping and the like. Examples of methods for shading zirconia ceramic materials or bodies include, but are not limited to, methods described in commonly owned U.S. Pat. No. 9,095,403, issued Aug. 4, 2015, U.S. Pat. No. 9,505,662, issued Nov. 29, 2016, U.S. Pat. No. 9,512,317, issued Dec. 6, 2016, and US Pub. No. 2018/0237345 A1 published Aug. 23, 2018, each of which are hereby incorporated herein by reference in their entireties.

In some embodiments, shaded yttria-stabilized zirconia ceramic powders or bisque bodies, each having a shade equivalence, for example, to a target Vita A1-D4® Classical shade, or bleached shade, have a percent transmittance at 700 nm (measured on a 1 mm thick sintered ceramic body prepared and measured according to the methods herein) that is less than or equal to 5% lower than the percent transmittance of an equivalent unshaded zirconia ceramic material. For example, the transmittance of a shaded zirconia ceramic material may be less than or equal to 3% lower, or less than or equal to 2% lower, or less than or equal to 0.5% lower, than the percent transmittance of an equivalent yttria-stabilized material in which coloring agents have not been incorporated (when measured on a 1 mm thick fully sintered zirconia ceramic body at 700 nm).

In certain embodiments, the magnesium-containing dopant is mixed or contacted with yttria-stabilized zirconia. Illustrative methods include soaking, painting, printing, or a salt solution additive with pressing or colloidal slurry.

In certain embodiments, the Mg-containing solution or the MgY-containing solution may contain a Mg concentration of 1.5 to 3.3 wt %, or 1.5 to 2.5 wt % for contacing (e.g., soaking, painting, printing) a YSZ block (e.g., a mill blank, wafer, or dental restoration) stabilized with 5 to 10 mol %, or 5 to 8 mol %, or 5 to 6.5 mol %, yttria. The resulting sintered YSZ may have an extrapolated L value in the range of 55 to 70, or 55 to 65, or 57 to 62 and T % at 700 nm in the range of 60 to 80%, or 60 to 75%, or 65 to 75%, or 70 to 75% for unshaded yttria doped zirconia.

In certain embodiments, the Mg-containing solution or the MgY-containing solution may contain a Mg concentration of 4.0 to 6.5 wt %, or 4.3 to 6.0 wt %, or 4.7 to 6.0 wt % for contacting (e.g., soaking, painting, printing) a YSZ block (e.g., a mill blank, wafer, or dental restoration) stabilized with 4 to 5.5 mol %, or 4.5 to 5 mol %, yttria. The resulting sintered YSZ may have an extrapolated L* value in the range of 60 to 75, or 60 to 70, or 66 to 70 and T % at 700 nm in the range of 55 to 75%, or 60 to 70%, or 60-65% for unshaded yttria doped zirconia.

In certain embodiments, the MgY-containing solution may contain a Mg concentration of 2.0 to 4.0 wt %, or 2.7 to 3.5 wt %, or 2.8 to 3.3 wt % and a yttrium concentration of 7.2 to 16.2 wt %, or 8.5 to 13.5 wt %, or 8.5 to 12 wt % for contacting (e.g., soaking, painting, printing) a YSZ block (e.g., a mill blank, wafer, or dental restoration) stabilized with 2 to 4.5 mol %, or 2 to 4 mol %, or 3-4 mol %, yttria. The resulting sintered YSZ may have an extrapolated L value in the range of 65 to 85, or 70 to 80, or 70 to 75 and T % at 700 nm in the range of 45 to 60%, or 50 to 60%, or 54 to 59% for unshaded yttria doped zirconia.

Soaking

Wafers may be prepared from porous, pre-sintered unshaded/shaded yttria-stabilized zirconia mill blanks (e.g., BruxZir zirconia milling blanks (unshaded, white YSZ porous zirconia blanks, between 3 to 5.8 mol % yttria stabilized; Glidewell Dental, Irvine, Calif.) by milling and preparation to a certain thickness (e.g., a final sintered thickness of approximately 1 mm). The wafer may be dipped and/or soaked into a Mg-containing solution or a MgY-containing solution. In some embodiments, the Mg-containing solution or MgY-containing solution may contain a magnesium nitrate salt concentration of 15 to 40%. In the embodiments with 2 to 5 mol % yttria-stabilized zirconia, the Mg-containing solution or Mg—Y containing solution may contain a magnesium nitrate salt concentration of 5 to 35%, such as 15-30%. In the embodiments with 5 to 6 mol % yttria-stabilized zirconia, the Mg containing solution or Mg—Y containing solution may contain a magnesium nitrate salt concentration of 1 to 25%, such as 12-20%. The Mg and Y-containing solution may contain between a yttrium chloride salt concentration of 5-50%, such as between 10-40%. The wafers are then dried and sintered.

In these embodiments the Mg concentration and Y concentration can be calculated from the salt concentration based on the molecular weight ratios as follows $$Mg\ concentration=(24.31/256.41)\times Magnesium\ nitrate\ hydrated\ salt\ concentration$$

$$Y\ concentration=(88.91/303.36)\times Yttrium\ chloride\ hydrated\ salt\ concentration$$

In the examples described below, wafers at 3 to 5.8Y were dipped/soak into Mg or MgY solution of different concentrations. These were then dried for at least 3 hours and sintered at 1 to 3 sets of sinter conditions. Characterizations for translucency, FT, L*, EDS, XRD, and grain size were performed.

Painting

Wafers may be prepared from porous, pre-sintered unshaded/shaded yttria-stabilized zirconia mill blanks (e.g., BruxZir zirconia milling blanks (unshaded, white YSZ porous zirconia blanks, between 3 to 5.8 mol % yttria stabilized; Glidewell Dental, Irvine, Calif.) by milling. A Mg-containing solution or a Mg—Y-containing solution may then be painted onto a surface of the wafer or dental restorations of 4-6 YSZ prior to sintering. In some embodiments, the Mg-containing solution may contain a magnesium nitrate salt concentration of 20 to 65 wt %, or 25 to 60 wt %, or 30 to 50 wt %, or 30 to 40 wt %. The painted wafers are then dried and sintered. In other embodiments a solution containing both Mg and Y may be painted and applied to wafers at 2-4.5 mol % YSZ. The solution may contain a magnesium nitrate salt concentration of 25 to 40 wt %, or 29 to 37 wt %, or 30 to 35 wt % and yttrium chloride salt concentration of 25-55 wt %, or 30 to 45 wt %, or 30 to 40 wt %.

In the examples described below, dental restorations of 3 to 5.8Y were painted between 1 to 6 layers at the incisal region with a water brush filled with Mg solution of different concentration. These were then dried for at least 3 hours and then sintered at 1 to 3 sets of sinter conditions. Characterizations for L*, EDS, etc. were performed.

Printing

Wafers may be prepared from porous, pre-sintered unshaded/shaded yttria-stabilized zirconia mill blanks (e.g., BruxZir zirconia milling blanks (unshaded, white YSZ porous zirconia blanks, between 3 to 5.8 mol % yttria stabilized; Glidewell Dental, Irvine, Calif.) by milling. A Mg-containing solution or a MgY-containing solution may then be sprayed or ink jet-printed onto a surface of the wafer mill blanks. In the embodiments with 3 to 4 mol % yttria-stabilized zirconia, the Mg-containing solution or MgY-containing solution may contain a magnesium nitrate salt concentration of 15 to 40%. In the embodiments with 4 to 4.7 mol % yttria-stabilized zirconia, the Mg-containing solution or Mg—Y containing solution may contain a magnesium nitrate salt concentration of 5 to 30%. In the embodiments with 4.7 to 6 mol % yttria-stabilized zirconia, the Mg containing solution or Mg—Y containing solution may contain a magnesium nitrate salt concentration of 1 to 20%. Additionally, the solution containing both Mg and Y may contain a yttrium chloride salt concentration of 25-55 wt %, or 30 to 45 wt %, or 30 to 40 wt %.

The painted wafers are then dried and sintered.

In the examples described below, wafers at 3 to 5.8Y were spray/print with Mg solution of different concentration. These were then dried for at least 3 hours and sintered at 1 to 3 sets of sinter conditions. Characterizations for translucency, L*, EDS, grain size, XRD were performed.

Salt Solution Additive in Press & Colloidal

In some embodiments, a liquid magnesium-containing solution is mixed with a dry yttria-stabilized zirconia powder. In other embodiments, a liquid magnesium-containing solution is mixed with a yttria-stabilized zirconia slurry. In some embodiments, the magnesium-containing solution is a magnesium salt solution having a magnesium salt concentration that results in an equivalent of MgO wt % of 0.001 to 4%, such as between 0.1-2%, or 0.2-1% or 0.3-0.7% relative to the zirconia weigh in the resulting sintered ceramic.

The resulting mixture is pressed or cast, respectively, into green state blocks. The green state blocks are then bisque and sintered at 1 to 3 sets of sintering conditions. The samples are milled out and characterized for translucency, FT, EDS, XRD, and grain size.

Other Methods

In some embodiments, a liquid magnesium-containing solution is sprayed on a dry yttria-stabilized zirconia powder.

In some embodiments, a liquid magnesium-containing solution is mixed with a yttria-stabilized zirconia slurry that is spray dried and ready for pressing into green state blocks.

In some embodiments, MgO is mixed with a yttria-stabilized zirconia slurry that is spray dried and ready for pressing into green state blocks.

In some embodiments, magnesia-stabilized zirconia is mixed with yttria-stabilized zirconia, then milled and heat-treated so that the magnesia-stabilized zirconia and the yttria-stabilized zirconia react together.

In some embodiments, a magnesium-containing salt solution, a yttria-containing salt solution, and a zirconia-containing solution can be mixed and reacted together.

In some embodiments, a Mg salt or MgO is pre-reacted with yttria and then mixed with zirconia.

Several illustrative embodiments are described below in the following numbered paragraphs:

1. A material comprising:

a sintered yttria-stabilized zirconia ceramic, stabilized by 3 mol % to 4.8 mol % yttria, wherein the sintered ceramic has a flexural strength greater than 500 MPa, a transmittance of 59% to 62% at 700 nm (when measured on a 1 mm thick fully sintered ceramic body), an average grain size of less than 4 μm, and a cubic phase of 20% to 40%.

2. The material of paragraph 1, wherein the ceramic has a fracture toughness greater than 2.2 MPa·m$^{1/2}$.

3. The material of paragraph 1 or 2, wherein the ceramic has a flexural strength greater than 800 MPa.

4. The material of any one of paragraphs 1 to 3, wherein the ceramic has an average grain size of less than 3 μm.

5. The material of any one of paragraphs 1 to 4, wherein the ceramic has a cubic phase of 25 to 38%.

6. The material of any one of paragraphs 1 to 5, wherein the ceramic further comprises 0.1 wt % to 1 wt % MgO.

7. The material of any one of paragraphs 1 to 6, wherein the ceramic is stabilized by 4 mol % yttria.

8. The material of any one of paragraphs 1 to 6, wherein the ceramic is stabilized by 4.7 mol % yttria.

9. The material of any one of paragraphs 1 to 8, wherein the ceramic has a transmittance of 59% to 60% at 700 nm (when measured on a 1 mm thick fully sintered ceramic body).

10. The material of any one of paragraphs 1 to 8, wherein the ceramic has a transmittance of 59% to 62% at 700 nm (when measured on a 1 mm thick fully sintered ceramic body).

11. The material of any one of paragraphs 1 to 10, wherein the ceramic has a cubic phase of 25 to 32%.

12. The material of any one of paragraphs 1 to 10, wherein the ceramic has a cubic phase of 30 to 37%.

13. The material of paragraph 6, wherein the ceramic is stabilized by 4 mol % yttria, and has a transmittance of 59% to 60% at 700 nm (when measured on a 1 mm thick fully sintered ceramic body), a cubic phase of 25 to 32%, and a flexural strength greater than 800 MPa.

14. The material of paragraph 6, wherein the ceramic is stabilized by 4.7 mol % yttria, and has a transmittance of 59% to 62% at 700 nm (when measured on a 1 mm thick fully sintered ceramic body), and a cubic phase of 30 to 37%.

15. A material comprising:

a sintered yttria-stabilized zirconia ceramic, stabilized by 4 mol % to 5.4 mol % yttria, wherein the sintered ceramic has a transmittance of 60% to 68% at 700 nm (when measured on a 1 mm thick fully sintered ceramic body), an average grain size of less than 4 μm, and a cubic phase of 25% to 45%, and wherein the sintered ceramic comprises 0.1 wt % to 2 wt % MgO.

16. The material of paragraph 15, wherein the ceramic has a fracture toughness greater than 1.7 MPa*m$^{1/2}$.

17. The material of paragraph 15 or 16, wherein the ceramic has an average grain size of less than 3.5 μm.

18. The material of any one of paragraphs 15 to 17, wherein the ceramic has a cubic phase of 30% to 42%.

19. The material of any one of paragraphs 15 to 17, wherein the ceramic has a cubic phase of 30% to 38%.

20. The material of any one of paragraphs 15 to 19, wherein the ceramic comprises 0.2 wt % to 0.7 wt % MgO.

21. The material of any one of paragraphs 15 to 19, wherein the ceramic comprises 0.2 wt % to 0.6 wt % MgO.

22. The material of any one of paragraphs 15 to 21, wherein the ceramic has a flexural strength greater than 500 MPa.

23. The material of any one of paragraphs 15 to 22, wherein the ceramic has a transmittance of 60% to 65% at 700 nm (when measured on a 1 mm thick fully sintered ceramic body).

24. The material of any one of paragraphs 15 to 23, wherein the ceramic is stabilized by 5.3 mol % yttria.

25. The material of paragraph 24, wherein the ceramic wherein the ceramic comprises 0.2 wt % to 0.6 wt % MgO, and has a transmittance of 60% to 65% at 700 nm (when measured on a 1 mm thick fully sintered ceramic body), a cubic phase of 32% to 45%, and a flexural strength greater than 500 MPa.

26. A material comprising:

a sintered yttria-stabilized zirconia ceramic, stabilized by 4.5 mol % to 6 mol % yttria, wherein the sintered ceramic has a transmittance of 65% to 70% at 700 nm (when measured on a 1 mm thick fully sintered ceramic body), an average grain size of less than 6 μm, and a cubic phase of 42% to 55%, and wherein the sintered ceramic comprises 0.1 wt % to 2 wt % MgO.

27. The material of paragraph 26, wherein the cubic phase is less than 50%.

28. The material of paragraph 26 or 27, wherein the ceramic has a fracture toughness greater than 1.5 MPa·m$^{1/2}$.

29. The material of any one of paragraphs 26 to 28, wherein the ceramic has an average grain size of less than 4 μm.

30. The material of any one of paragraphs 26 to 29, wherein the ceramic has a cubic phase of 40% to 50%.

31. The material of any one of paragraphs 26 to 29, wherein the ceramic has a cubic phase of 44% to 48%.

32. The material of any one of paragraphs 26 to 31, wherein the ceramic comprises 0.2 wt % to 0.7 wt % MgO.

33. The material of any one of paragraphs 26 to 31, wherein the ceramic comprises 0.2 wt % to 0.6 wt % MgO.

34. The material of any one of paragraphs 26 to 33, wherein the ceramic is stabilized by 4.5 mol % to 5.5 mol % yttria.

35. The material of any one of paragraphs 26 to 34, wherein the ceramic has a transmittance of 65% to 70% at 700 nm (when measured on a 1 mm thick fully sintered ceramic body).

36. The material of any one of paragraphs 26 to 35, wherein the ceramic has a flexural strength greater than 500 MPa.

37. The material of paragraph 34, wherein the ceramic comprises 0.2 wt % to 0.6 wt % MgO, and has a transmittance of 65% to 70% at 700 nm (when measured on a 1 mm thick fully sintered ceramic body), a flexural strength greater than 500 MPa, and a cubic phase of 44% to 48%.

38. A material comprising:

a sintered yttria-stabilized zirconia ceramic, stabilized by 5 mol % to 6.5 mol % yttria, wherein the sintered ceramic has a transmittance of 70% to 80% at 700 nm (when measured on a 1 mm thick fully sintered ceramic body), an average grain size of less than 10 μm, and a cubic phase of 42% to 70%, and wherein the sintered ceramic comprises 0.1 wt % to 2 wt % MgO.

39. The material of paragraph 16, wherein the cubic phase is less than 55%.

40. The material of paragraph 38 or 39, wherein the ceramic has a fracture toughness greater than 1.5 MPa*m$^{1/2}$.

41. The material of any one of paragraphs 38 to 40, wherein the ceramic has an average grain size of less than 5 μm.

42. The material of any one of paragraphs 38 to 41, wherein the ceramic has a cubic phase of 48% to 56%.

43. The material of any one of paragraphs 38 to 41, wherein the ceramic has a cubic phase of 50% to 65%.

44. The material of any one of paragraphs 38 to 43, wherein the ceramic comprises 0.2 wt % to 0.7 wt % MgO.

45. The material of any one of paragraphs 38 to 43, wherein the ceramic comprises 0.2 wt % to 0.6 wt % MgO.

46. The material of any one of paragraphs 38 to 45, wherein the ceramic is stabilized by 6 mol % yttria.

47. The material of any one of paragraphs 38 to 46, wherein the ceramic has a transmittance of greater than 75% (when measured on a 1 mm thick fully sintered ceramic body).

48. The material of paragraph 45, wherein the ceramic is stabilized by 6 mol % yttria, has a transmittance of greater than 75% (when measured on a 1 mm thick fully sintered ceramic body), a cubic phase of 50% to 65%, and an average grain size of less than 5 μm.

49. The material of any one of paragraphs 1 to 48, wherein the yttria-stabilized zirconia ceramic is shaded by a coloring agent comprising at least one metal selected from Fe, Co, Cu, Pr, Tb, Cr or Er.

50. A dental prosthetic device comprising the ceramic material of any one of paragraphs 1 to 49.

51. A method for making a sintered ceramic body comprising:

painting a surface of a porous yttria-stabilized zirconia mill blank with a magnesium-containing solution; and sintering the painted mill blank resulting in a sintered ceramic body.

52. A method for making a sintered ceramic body comprising:

spraying or ink jet printing a magnesium-containing solution onto a surface of a porous yttria-stabilized zirconia mill blank; and sintering the sprayed or printed mill blank resulting in a sintered ceramic body.

53. A method for making a sintered ceramic body comprising:

mixing a magnesium-containing solution with a yttria-stabilized zirconia powder;

pressing or casting the resulting mixture into a green block;

bisque the green block resulting in a bisqued body; and sintering the bisqued body resulting in a sintered ceramic body.

54. The method of paragraph 53, wherein the bisque block has a pore size of 30 nm to 120 nm, and a density of 48% to 62%.

55. The method of paragraph 54, wherein the bisque block has a pore size of 30 nm to 80 nm, and a density of 54% to 60%.

56. The method of any one of paragraphs 53 to 55, wherein the sintered body has a yttria content of 4 mol % to 6 mol % and MgO content of 0.2 wt % to 0.7 wt %.

57. A method comprising:
providing a Mg-containing solution or a MgY-containing solution having a Mg concentration of 1.5 to 3.3 wt % for contacting a yttria-stabilized zirconia block, wherein the block is stabilized with 5 to 10 mol % yttria.

16

58. A method comprising:
providing a Mg-containing solution or a MgY-containing solution having a Mg concentration of 4.0 to 6.5 wt % for contacting a yttria-stabilized zirconia block, wherein the block is stabilized with 4 to 5.5 mol % yttria.

59. A method comprising:
providing a MgY-containing solution having a Mg concentration of 2.0 to 4.0 wt % and a Y concentration of 7.2 to 16.2 wt % for contacting a yttria-stabilized zirconia block, wherein the block is stabilized with 2 to 4.5 mol % yttria.

60. A solution comprising a Mg concentration of 2.0 to 4.0 wt % and a Y concentration of 7.2 to 16.2 wt %.

EXAMPLES

TABLE 1

| Ex. | Mg Additive Method | Block Method | Block mol % yttria | $Mg(NO_3)_2$ •$6H_2O$ (wt % in sol.) | $YCl_3$ •$6H_2O$ (wt % in sol.) | MgO wt % | $Y_2O_3$ mol % | Cubic % | T % at 700 nm | GS (μm) | Fracture Toughness (MPa*m$^{1/2}$) |
|---|---|---|---|---|---|---|---|---|---|---|---|
| 1 | Soak-bisque | Colloidal | 3 | 25 | 15 | 0.75% | 3.78% | 25% | 53.4 | 1.3 | 3.1 |
| 2 | Soak-bisque | Colloidal | 3 | 25 | 30 | 0.97% | 3.84% | | 54.7 | 3.3 | 2.5 |
| 3 | Soak-bisque | Colloidal | 3 | 30 | 25 | 0.86% | 4.04% | | 55.2 | 3.8 | 3.1 |
| 4 | Soak-bisque | Colloidal | 3 | 35 | 20 | 0.91% | 4.21% | 30% | 56.3 | 4.5 | 2.9 |
| 5 | Soak-bisque | Colloidal | 3 | 13 | 40 | 0.64% | 4.49% | 42% | 62 | 4.0 | 2.3 |
| 6 | Soak-bisque | Colloidal | 3 | 36.5 | 32 | 0.45% | 4.95% | 33% | 56.8 | 3.8 | 3.1 |
| 7 | Soak-bisque | Colloidal | 4.7 | 10 | n/a | 0.00% | 4.89% | | 57.2 | | 2.9 |
| 8 | Soak-bisque | Colloidal | 4.7 | 20 | n/a | 0.23% | 4.80% | 36.6% | 61.2 | 1.8 | 2.3 |
| 9 | Soak-bisque | Colloidal | 4.7 | 30 | n/a | 0.48% | 4.82% | 45.9% | 68.4 | 2.91 | 2.16 |
| 10 | Soak-bisque | Colloidal | 5.8 | 5 | n/a | 0.01% | 5.93% | | 68.3 | 2.3 | 1.94 |
| 11 | Soak-bisque | Colloidal | 5.8 | 16 | n/a | 0.15% | 5.88% | 54.9% | 77.4 | 3.85 | 1.9 |
| 12 | Soak-bisque | Colloidal | 5.8 | 20 | n/a | 0.34% | 5.91% | 61% | 75.5 | 3.24 | 1.88 |
| 13 | Inkjet-bisque sample | Colloidal | 4.7 | 28 | n/a | 0.57% | 4.84% | 46% | 66.1 | 2.2 | 2.3 |
| 14 | Inkjet-bisque sample | Colloidal | 5.8 | 16 | n/a | 0.34% | 5.97% | 66% | 76.6 | 3.86 | 1.9 |
| 15 | Solution additive mixing into press powder | Press | 5.3 | | n/a | 0.41% | 5.41% | 48.9% | 63 | 3.53 | 2.1 |
| C1 | Block with Y only; no Mg | Colloidal | 3 | n/a | n/a | n/a | 3.04% | 11.9% | 51 | 0.5 | 5 |
| C2 | Block with Y only; no Mg | Press | 4 | n/a | n/a | n/a | 3.94% | 21.5% | 52.5 | 0.5 | 3.5 |
| C3 | Block with Y only; no Mg | Colloidal | 4.7 | n/a | n/a | n/a | 4.66% | 33.5% | 56.9 | 0.9 | 2.8 |

TABLE 1-continued

| Ex. | Mg Additive Method | Block Method | Block mol % yttria | Mg(NO$_3$)$_2$ •6H$_2$O (wt % in sol.) | YCl$_3$ •6H$_2$O (wt % in sol.) | MgO wt % | Y$_2$O$_3$ mol % | Cubic % | T % at 700 nm | GS (μm) | Fracture Toughness (MPa*m$^{1/2}$) |
|---|---|---|---|---|---|---|---|---|---|---|---|
| C4 | Block with Y only; no Mg | Colloidal | 5.8 | n/a | n/a | n/a | | 51.7% | 63.8 | 3.6 | 2.2 |
| C5 | Block with Y only; no Mg | Colloidal | 6.3 | n/a | n/a | n/a | | 63.8% | 65 | 4.2 | |
| C6 | Block with Y only; no Mg | | 5.3 | n/a | n/a | n/a | 5.35% | 41.5% | 57 | 1.7 | 2.5 |

C1-C6 are comparative examples.

TABLE 2

| Ex. | Mg Additive Method | Block Method | Sample Type | Block mol % yttria | Solution ID | Mg(NO$_3$)$_2$ •6H$_2$O (wt %) | YCl$_3$• 6H$_2$O (wt %) | L*$_{raw}$ | L*$_{Extrapolated}$ | Extrapolated Translucency at 700 nm | Grain Size (μm) |
|---|---|---|---|---|---|---|---|---|---|---|---|
| C7 | painting | pressed | Crown | 3 | none | — | — | 74.7 | 78.5 | 50.8 | 1.0 |
| 16 | painting | pressed | Crown | 3 | A | 33% | 33% | 72.4 | 74 | 55.7 | 1.8 |
| C8 | painting | pressed | Crown | 4 | none | n/a | n/a | 73.2 | 75.8 | 54 | |
| 17 | painting | pressed | Crown | 4 | A | 33% | 33% | 70.9 | 71.7 | 58.9 | |
| C9 | painting | Colloidal | Crown | 4.7 | none | — | — | 72.3 | 74.2 | 55.9 | |
| 18 | painting | Colloidal | Crown | 4.7 | B | 28% | n/a | 68.5 | 67.4 | 64 | |
| C10 | painting | Colloidal | Crown | 5.8 | none | — | — | 67.7 | 65.9 | 65.7 | |
| 19 | painting | Colloidal | Crown | 5.8 | C | 60% | n/a | 64.4 | 60 | 72.9 | |

C# are comparative examples

TABLE 3

| Ex. | Mg Additive Method | Block Method | Sample Type | Block mol % yttria | Solution ID | L*$_{raw}$ | L*$_{Extrapolated}$ | Extrapolated Translucency at 700 nm | Grain Size (μm) |
|---|---|---|---|---|---|---|---|---|---|
| C11 | painting | Colloidal | Crown | 3 | Nacera ® Blue X* | 72.2 | 74.0 | 56.1 | 3.2 |
| C12 | painting | Colloidal | Crown | 4 | Nacera ® Blue X* | 71 | 71.8 | 58.7 | |
| C13 | painting | Colloidal | Crown | 4.7 | Nacera ® Blue X* | 70.3 | 70.6 | 60.2 | |
| C14 | painting | Colloidal | Crown | 5.8 | Nacera ® Blue X* | 68.3 | 67 | 64.5 | |

*Nacera ® Blue X is purchased from DOCERAM Medical Ceramics GmbH, Germany and is a proprietary formulation.
C# are comparative examples Block Composition
Slip Casting:

A green and bisque body were made by using an yttria-stabilized zirconia or a blend of different mol % yttria-stabilized zirconia powder provided by the manufacturer (Tosoh USA). The powders are dispersed in slurry form via Dolapix CE 64, with a solid loading between 69-80%. Coloring agents may be added to obtain an equivalent Vita Classical Shades and bleach shades. Shaded formulations were obtained by mixing at least one or more of the following coloring agent comprising a metal selected from terbium (Tb), chromium (Cr), erbium (Er), or Cobalt (Co). Coloring agents may be added as hydrated salts and/or oxide powders pre-reacted with zirconia. The slurry were mixed with high shear mixer, following by mixing in the horizontal bead mill for homogeneity. The slurry was then cast into molds to form 98 mm blocks. Casted blocks were then dried at room temperature and weighed until stabilized into green body. Green state blocks were loaded into the oven and heated to 950° C. to form bisque blocks.

Pressing:

Uniaxial press method was used for pressing. A green and bisque body were made using an yttria-stabilized zirconia with binder or a blend of different mol % yttria-stabilized zirconia powder with binder provided by the manufacturer (Tosoh USA). Colorants consisted of pre-reacted compounds of zirconia may be added into unshaded white yttria-stabilized zirconia powder and homogenously dry mixed to obtain an equivalent Vita Classical Shades and bleach shades. These powders were pressed into 98 mm blocks with a density of 3.21+/−0.1 g/cc$^3$. Blocks were then taken to the bisque oven fired to 1050° C. to obtain bisque bodies.

Preparation of Additive Liquids

A method to treat part or full surface of a porous dental zirconia article to improve the translucency and esthetic properties of the final dental product compared to untreated dental product.

Steps in this method include preparing porous dental zirconia article via CAD/CAM process, prepping the porous dental zirconia article with the aid of dental technicians, preparing the liquid composition by mixing the metal ions of Mg or the mixture Mg and Y with a solvent, and treating part or full surface of a porous dental zirconia article. The process for treatment may include painting method via water brush, dipping method, printing, or other method that can apply the liquid composition to the surface of the porous dental zirconia parts.

Unshaded zirconia bisque samples treated with Mg/Y-containing liquid compositions were sintered and tested.

Treatment compositions comprising $Mg(NO_3)_2 \cdot 6H_2O$, $YCl_3 \cdot 6H_2O$, and deionized water were prepared for a range of $Mg(NO_3)_2 \cdot 6H_2O$ concentrations in the range of 5 wt % to approximately 80 wt %, and $YCl_3 \cdot 6H_2O$ concentrations in the range of 5 wt % to approximately 80 wt %. All the weight percentage were based on the total weight of the liquid composition. $Mg(NO_3)_2 \cdot 6H_2O$, or the mixture of $Mg(NO_3)_2 \cdot 6H_2O$ and $YCl_3 \cdot 6H_2O$ were mixed with deionized water until the $Mg(NO_3)_2$ or both the $Mg(NO_3)_2 \cdot 6H_2O$ and $YCl_3 \cdot 6H_2O$ were completely dissolved, or until no more $Mg(NO_3)_2 \cdot 6H_2O$ and $YCl_3 \cdot 6H_2O$ were visible to the unaided eye, forming the treatment liquid compositions.

Test Methods

Energy Dispersive X-ray (EDX)

The elemental composition of sintered zirconia ceramic bodies were measured by Energy Dispersive X-ray (EDX), (QUANTAX 75, BRUKER), using the focused electron beam in the scanning electron microscope (SEM, TM3030 Plus, Hitachi, Japan). The measurement conditions were as follows:

Energy resolution Copper: ≤eV FWHM at Cu Kα; working distance: 7-9 mm; ICR detection: 5-18 kcps; accelerated voltage: 15 kV; scanning mode: exhaust, area; magnification: 5 k; selected elements: Zr, Y, Hf, Mg, C, N, O.

The values quantified via EDX are normalized with respect to Zr and converted to their respective oxides such as MgO %-EDS and $Y_2O_3$%-EDS using the below equation:

$$MgO\ \%\text{-EDS} = (Mg/Zr)*(40.3044/24.305)$$

$$Y_2O_3\%\text{-EDS} = (Y/Zr)*0.5*(225.8117/88.91)$$

The MgO wt % added to the system is calculated using the equation:

$$(MgO\ wt\ \%) = ((MgO\ \%\text{-EDS}) - 0.0002)/1.1326$$

The Yttria mol % added to the system is calculated using the equation:

$$(Y_2O_3\ mol\ \%) = ((Y_2O_3\%\text{-EDS}) + 0.0095)/2.3029$$

L* Measurement

Spectral image data of the labial faces of sintered crowns and wafers were collected using a SpectroShade Micro II imaging spectrophotometer. Prior to testing, the Spectro-Shade Micro II was calibrated using the white and green tiles on the docking base provided with the unit. Samples were imaged over a dark background (the AC/DC switching adaptor supplied with the SpectroShade Micro II; MEAN WELL ENTERPRISES, GS40A15-P1M). When measuring the crowns, a small dot of wax was used to support the crown by the cingulum upon the dark background, such that the labial face was approximately level with the dark background surface and exposed for spectral imaging. The SpectroShade Micro II (with mouthpiece attached) was then aligned by hand to capture a spectral image measurement file for each crown.

SpectroShade measurement files were then uploaded to PC and analyzed using the SpectroShade Analysis software. L*a*b color space value averages were collected from each sample. For crowns, L*a*b color space value averages were collected from spot G in FIG. 1, corresponds to an area in the incisal region of the crown approximately 0.25 to 0.65 mm above the incisal edge and is approximately 0.3×2 mm. The crown thickness at spot G was 1.3 mm. AutoHotKey desktop automation software was utilized (corresponding to areas of approximately 180×72 microns) within the SpectroShade Analysis software, extracting the L*a*b color space values for the selected area to clipboard with a call to Capture2Text optical character recognition software. Then paste the L*a*b values into a Notepad document.

In addition, the L* Extrapolated and Extrapolated Translucency values corresponding to a 1 mm thickness were calculated from the raw L* values using the equations below:

$$L*\text{Extrapolated} = (L^*_{raw} - 30.805)/.5595 \frac{(L^*_{raw} - 80.805)}{0.3393}$$

$$\text{Extrapolated Translucency} = (L^*_{raw} - 98.516)/(-0.4687) \frac{(L^*_{raw} - 98.516)}{-0.4687}$$

X-Ray Diffraction (XRD)

X-Ray diffractometer (XRD, Rigaku SmartLab, Japan) was used for phase identification. The measurement conditions were as follows. Radiation source: Cukα (=1.541862A); measurement mode: step scanning; scan speed: 1° per minute; step width: 0.02 deg; Incident slit: ½ deg; Length limiting slit: 10.0 mm; receiving slit #1: 4deg; receiving slit #2: 13.0 mm; scan mode: continuous; and scan range (2θ):20°-80°.

The diffraction patterns were analyzed using PDXL2 software. The XRD patterns were first search-matched to corresponding JCPDS files and then peak-fitting was performed using WPPD based on the Pawley method. The XRD patterns were fit by refining the peak shape and lattice constants.

Density

For the examples described herein, density calculations of ceramic bodies were determined as follows. The density of green body blocks were calculated by measuring the weight and dividing by the volume calculated from the dimensions of the green block. The density of bisque body blocks were determined by liquid displacement methods of Archimedes principle. Flat wafers were sectioned or milled from a bisque block and dried prior to measuring the dry mass. Samples were then saturated with deionized water under vacuum (29-30 in Hg vacuum pressure) for one hour prior to measuring the suspended and saturated masses. All masses were measured to four decimal points precision. Relative densities of the samples were calculated based on theoretical densities corresponding to yttria content as indicated in Table 1. For purposes herein, a ceramic material that is fully sintered has a density that is about 98%, or greater, of the theoretical density.

TABLE 4

Theoretical Densities of Yttria-Stabilized Zirconia Composition

| Yttria (mol %) | Density (g/cm³) |
|---|---|
| 5.2 | 6.058 |
| 5.3 | 6.056 |
| 5.4 | 6.054 |
| 5.6 | 6.050 |
| 5.8 | 6.046 |
| 5.9 | 6.046 |
| 6.0 | 6.043 |
| 6.1 | 6.042 |
| 6.3 | 6.037 |
| 6.4 | 6.035 |
| 6.5 | 6.033 |
| 6.7 | 6.030 |
| 6.8 | 6.028 |
| 6.9 | 6.026 |
| 7.0 | 6.025 |
| 7.1 | 6.023 |
| 7.4 | 6.019 |
| 7.9 | 6.011 |

Fracture Toughness Test

Samples for fracture toughness testing were milled and sintered. Tabs of ceramic materials were milled out of a bisque block. The bisque tabs have the dimensions of approximately 13-15 mm, thickness=1-5 mm after sintering. Polishing was carried out to obtain a scratch-free surface according to the polishing steps of Table 2. The polished side with the fewest observed defects was chosen as the side for fracture toughness test. Fracture toughness testing was performed on a Shimadzu Micro Hardness Tester (HMV-G21) testing machine with a Vickers indenter fixture. The length of the crack and indentation diagonal were measured by built in optical microscope (×10, ×40). The method of testing fracture toughness was based on Brian Lawn's calculation (1980) and G. R. Anstis (J. Am. Ceram. Soc., 64(9), P533-538, 1981). Using the equation:

$$K_{IC}=0.0205*[2\sqrt{(E/H)}]*[P/(3/2\sqrt{C})]$$

Wherein $K_{ic}$: Fracture Toughness (MPa·m$^{1/2}$); E: Young's modulus (GPa); H: Vickers hardness (GPa)*, calculated by $$H=1.854*(P/d^2)$$

Wherein P applied load (N); C: crack length from the center of the impression to the crack tip; d: the length of the indentation diagonal. (Hardness Measurement Ref.: Vander, G. F. (2000). Microindentation hardness testing according to H. Kuhn & D. Medlin (Eds.), ASM Handbook, Volume 8: Mechanical Testing and Evaluation (pp. 221-231). ASM International.)

TABLE 5

| Step # | Grinding Grit | Polishing Media | Force (lbs) | Head Speed (rpm) | Plate Speed (rpm) | Duration (min) |
|---|---|---|---|---|---|---|
| 1 | 80 | — | 30 | 80 | 120 | 0.5-1 |
| 2 | 220 | — | 30 | 80 | 120 | 1 |

TABLE 5-continued

| Step # | Grinding Grit | Polishing Media | Force (lbs) | Head Speed (rpm) | Plate Speed (rpm) | Duration (min) |
|---|---|---|---|---|---|---|
| 3 | 500 | — | 30 | 80 | 120 | 7 |
| 4 | 1200 | — | 30 | 80 | 120 | 12 |
| 5 | — | 15 µm diamond suspension | 30 | 80 | 120 | 15 |
| 6 | — | 3 µm diamond suspension | 30 | 80 | 120 | 15 |
| 7 | — | 1 µm diamond suspension | 30 | 80 | 120 | 15 |
| 8 | — | 0.06 µm Silica Suspension | 30 | 80 | 120 | 15 |

Translucency

Sintered body translucency was determined by measuring the percent transmittance of D65 light at a wavelength of 700 nm from a 1 to 1.1 mm thick sintered sample. Translucency wafers were sectioned or milled from a bisque block and machined to a diameter corresponding to a final diameter of approximately 30 mm after sinter. The wafers were then ground flat until visually free of defects with 1200 grit and 2000 grit SiC polishing paper. The final bisque thickness corresponded to 1 mm after sintering and polishing. Samples ground to the desired shape were removed of surface dust and then sintered according to the sintering profile(s) described herein.

Total transmittance spectra were measured between the wavelengths of 360 nm to 740 nm with a Konica-Minolta CM5 spectrophotometer illuminated by a D65 light source for all samples. Information contained in the data tables herein refer to measurements at 700 nm or 500 nm wavelengths, as indicated, which are extracted from these measurements. The spectrophotometer was calibrated to white and black prior to measurement. Translucency samples were placed flush against the (approximately) 25 mm integrating sphere aperture. A minimum of two spectra were collected per sample and average to yield a final measured transmittance spectra (S-TM). Collected transmittance data may be reported as "percent (%) transmittance".

Opacity Measurement

Wafers with a thickness of 1+/−0.1 mm, polished according to the Translucency Test Method, were measured between the wavelength of 400 nm to 700 nm with a Konica-Minolta CM5 spectrophotometer at opacity mode (reflection mode; Specular component type: SCI; Measurement area diameter=8 mm) illuminated by a D65 light source for all samples. Before testing, the machine was calibrated. The wafers were measured under the white and dark background. A white calibration tile (avian Technology LLC, FWT-99-02C) was used for the white background. The dark background using a zero calibration box (Konica Minolta, CM-A124). A minimum of two spectra were collected per sample and averaged to yield the final measured opacity.

Mercury Porosimetry

Pore size and pore size distributions were measured on a 1 gram to 4 gram sample obtained from a bisque block. Samples were dried before mercury intrusion. Intrusion was performed with a Micrometrics Autopore V porosimeter with set pressure ranges from total vacuum to 60,000 psi using Micromeritics penetrometers models #7 and #9. The median pore diameter (volume) from the measurement was reported as the Median pore diameter.

Method for Determining Average Grain Size

Sintered samples were cross-sectioned and polished to remove surface roughness. The samples were analyzed using SEM (TM3030 Plus, Hitachi, Japan). The average grain size was estimated according to the Heyn Lineal Intercept Procedure by counting the number of grains intercepted by one or more straight lines to yield at least 20 total intercepts. In case of bimodal microstructures the intercepts were analyzed in the large grain size regions.

In view of the many possible embodiments to which the principles of the disclosed invention may be applied, it should be recognized that the illustrated embodiments are only preferred examples of the invention and should not be taken as limiting the scope of the invention.

What is claimed is:

1. A material comprising:

a sintered yttria-stabilized zirconia ceramic, stabilized by 4.5 mol % to 6 mol % yttria, wherein the sintered ceramic has a transmittance of 65% to 70% at 700 nm (when measured on a 1 mm thick fully sintered ceramic body), an average grain size of less than 6 μm, a fracture toughness greater than 1.5 MPa·m$^{1/2}$, and a cubic phase of 40% to 50%, and wherein the sintered ceramic comprises 0.1 wt % to 2 wt % MgO.

2. The material of claim 1, wherein the ceramic has an average grain size of less than 4 μm.

3. The material of claim 1, wherein the ceramic has a cubic phase of 42% to 50%.

4. The material of claim 1, wherein the ceramic has a cubic phase of 44% to 48%.

5. The material of claim 1, wherein the ceramic comprises 0.2 wt % to 0.7 wt % MgO.

6. The material of claim 1, wherein the ceramic comprises 0.2 wt % to 0.6 wt % MgO.

7. The material of claim 1, wherein the ceramic is stabilized by 4.5 mol % to 5.5 mol % yttria.

8. The material of claim 1, wherein the ceramic has a flexural strength greater than 500 MPa.

9. The material of claim 1, wherein the ceramic comprises 0.2 wt % to 0.6 wt % MgO, and has a transmittance of 65% to 70% at 700 nm (when measured on a 1 mm thick fully sintered ceramic body), a flexural strength greater than 500 MPa, and a cubic phase of 44% to 48%.

10. The material of claim 9, wherein the ceramic is stabilized by 4.5 mol % to 5.5 mol % yttria.

11. The material of claim 1, wherein the yttria-stabilized zirconia ceramic is shaded by a coloring agent comprising at least one metal selected from Fe, Co, Cu, Pr, Tb, Cr or Er.

* * * * *